United States Patent
Al-Muhtaseb et al.

(10) Patent No.: US 8,150,160 B2
(45) Date of Patent: Apr. 3, 2012

(54) AUTOMATIC ARABIC TEXT IMAGE OPTICAL CHARACTER RECOGNITION METHOD

(75) Inventors: Husni A. Al-Muhtaseb, Dhahran (SA); Sabri A. Mahmoud, Dhahran (SA); Rami Qahwaji, Bradford (GB)

(73) Assignee: King Fahd University of Petroleum & Minerals, Dhahran (SA)

( * ) Notice: Subject to any disclaimer, the term of this patent is extended or adjusted under 35 U.S.C. 154(b) by 560 days.

(21) Appl. No.: 12/382,916

(22) Filed: Mar. 26, 2009

(65) Prior Publication Data

US 2010/0246963 A1    Sep. 30, 2010

(51) Int. Cl.
G06K 9/18    (2006.01)
G06K 9/46    (2006.01)
G06K 9/66    (2006.01)

(52) U.S. Cl. .................................. 382/185; 382/190
(58) Field of Classification Search .................. 382/181, 382/185, 190
See application file for complete search history.

(56) References Cited

U.S. PATENT DOCUMENTS

| | | | |
|---|---|---|---|
| 5,050,219 A | 9/1991 | Maury | |
| 5,151,950 A | 9/1992 | Hullender | |
| 5,428,692 A | 6/1995 | Kuehl | |
| 5,524,065 A | 6/1996 | Yagasaki | |
| 5,533,147 A | 7/1996 | Arai | |
| 5,862,251 A | 1/1999 | Al-Karmi et al. | |
| 5,933,525 A | 8/1999 | Makhoul et al. | |
| 6,370,269 B1 | 4/2002 | Al-Karmi et al. | |
| 7,327,883 B2 | 2/2008 | Polonowski | |
| 2001/0032070 A1 | 10/2001 | Teicher | |
| 2004/0117192 A1 | 6/2004 | Miletzki | |
| 2006/0215937 A1 | 9/2006 | Snapp | |
| 2008/0025610 A1* | 1/2008 | Abdulkader | 382/185 |
| 2010/0080463 A1* | 4/2010 | He et al. | 382/186 |

FOREIGN PATENT DOCUMENTS

EP    0692768    1/1996

OTHER PUBLICATIONS

WO 2008/138356 A2, A large-scale arabic omin font-writtentn ocr based on an analogy with hmm-based asr, Nov. 20, 2008.*
"Test of two Arabic OCR Programs"; http://www.hf-fak.uib.no/smi/ksv/arabocr.html ; printed on Jul. 7, 2008; 4 pages.
"Arabic-Automatic Reader"; http://www.worldlanguage.com/Products/Arabic-Automatic-Reader-Gold-Edition-19-Languages-ArabicArabic-CzechArabic-45327.htm ; printed on Jul. 7, 2008; 2 pages.
"OmniPage vs. Sakhr"; http://people.csail.mit.edu/gremio/publications/Kanungo-etal-SPIE99.pdf ; printed on Jul. 7, 2008; 12 pages.

* cited by examiner

*Primary Examiner* — John Strege
(74) *Attorney, Agent, or Firm* — Richard C. Litman

(57) ABSTRACT

The automatic Arabic text image optical character recognition method includes training a text recognition system using Arabic printed text, using the produced models for classification of newly unseen Arabic scanned text, and generating the corresponding textual information. Scanned images of Arabic text and copies of minimal Arabic text are used in the training sessions. Each page is segmented into lines. Features of each line are extracted and input to Hidden Markov Model (HMM). All training data training features are used. HMM runs training algorithms to produce codebook and language models. In the classification stage new Arabic text is input in scanned form. Line segmentation where lines are extracted is passed through. In the feature stage, line features are extracted and input to the classification stage. In the classification stage the corresponding Arabic text is generated.

16 Claims, 4 Drawing Sheets

AUTOMATIC ARABIC TEXT IMAGE OPTICAL CHARACTER RECOGNITION METHOD

BACKGROUND OF THE INVENTION

1. Field of the Invention

The present invention relates to optical character recognition (OCR), and more specifically to an automatic Arabic text image optical character recognition method that provides for the automatic character recognition of optical images of Arabic text, that is, word, sub-word, and character segmentation free.

2. Description of the Related Art

Arabic Text Recognition (ATR) has not been researched as thoroughly as Latin, Japanese, or Chinese. The lag of research on Arabic text recognition compared with other languages (e.g. Latin or Chinese) may be attributed to lack of adequate support in terms of journals, books etc. and lack of interaction between researchers in this field, lack of general supporting utilities like Arabic text databases, dictionaries, programming tools, and supporting staff, and late start of Arabic text recognition (first publication in 1975 compared with the 1940s in the case of Latin character recognition). Moreover, researchers may have shied away from investigating Arabic text due to the special characteristics of Arabic language.

Due to the advantages of Hidden Markov Models (HMM), researchers have used them for speech and text recognition. HMM offer several advantages. When utilizing HMM, there is no need for segmenting the Arabic text because the HMM's are resistant to noise, they can tolerate variations in writing, and the HMM tools are freely available.

Some researchers use HMM for handwriting word recognition, while others use HMM for text recognition. Moreover, it is well known that HMM has been used for off-line Arabic handwritten digit recognition and for character recognition. Additionally, it has been demonstrated that techniques that are based on extracting different types of features of each digit as a whole, not on the sliding window principle used by the majority of researchers using HMM, have to be preceded by a segmentation step, which is error-prone. Techniques using the sliding window principles and extracting different types of features are also well known. Such techniques have been used for online handwritten Persian characters and for handwritten Farsi (Arabic) word recognition.

Examples of existing methods include a database for Arabic handwritten text recognition, a database for Arabic handwritten checks, preprocessing methods, segmentation of Arabic text, utilization of different types of features, and use of multiple classifiers.

Thus, an automatic Arabic text image optical character recognition method solving the aforementioned problems is desired.

SUMMARY OF THE INVENTION

The automatic Arabic text image optical character recognition method includes training of the system to Arabic printed text and then using the produced models for classification of newly unseen Arabic scanned printed text, then generating the recognized Arabic textual information. Scanned images of printed Arabic text and copies of our minimal Arabic text are used to train the system. Each page is segmented into lines. The features of each line are extracted using the presented technique. These features are input to the Hidden Markov Model (HMM). The features of all training data are presented. HMM runs its training algorithms to produce the codebook and language models.

In the classification stage, a new Arabic printed text image in scanned form is input to the system. It passes through line segmentation where lines are extracted. In the feature stage, the features of these lines are extracted and input to the classification stage. In the classification stage, the recognized Arabic text is generated. This is the output of the system, which corresponds to scanned input image data.

The text produced is analyzed, and the recognition rates computed. The achieved high recognition rates indicate the effectiveness of the system's feature extraction technique and the usefulness of the minimal Arabic text and the statistical analysis of Arabic text that is implemented with the system.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The automatic Arabic text image optical character recognition method, hereinafter referred to as the OCR method, has steps that may be implemented on a computer system. Such computer systems are well known by persons having ordinary skill in the art, and may comprise an optical scanner, a processor for executing software implementing the OCR method steps, and a display device for displaying the results.

Figure 1:
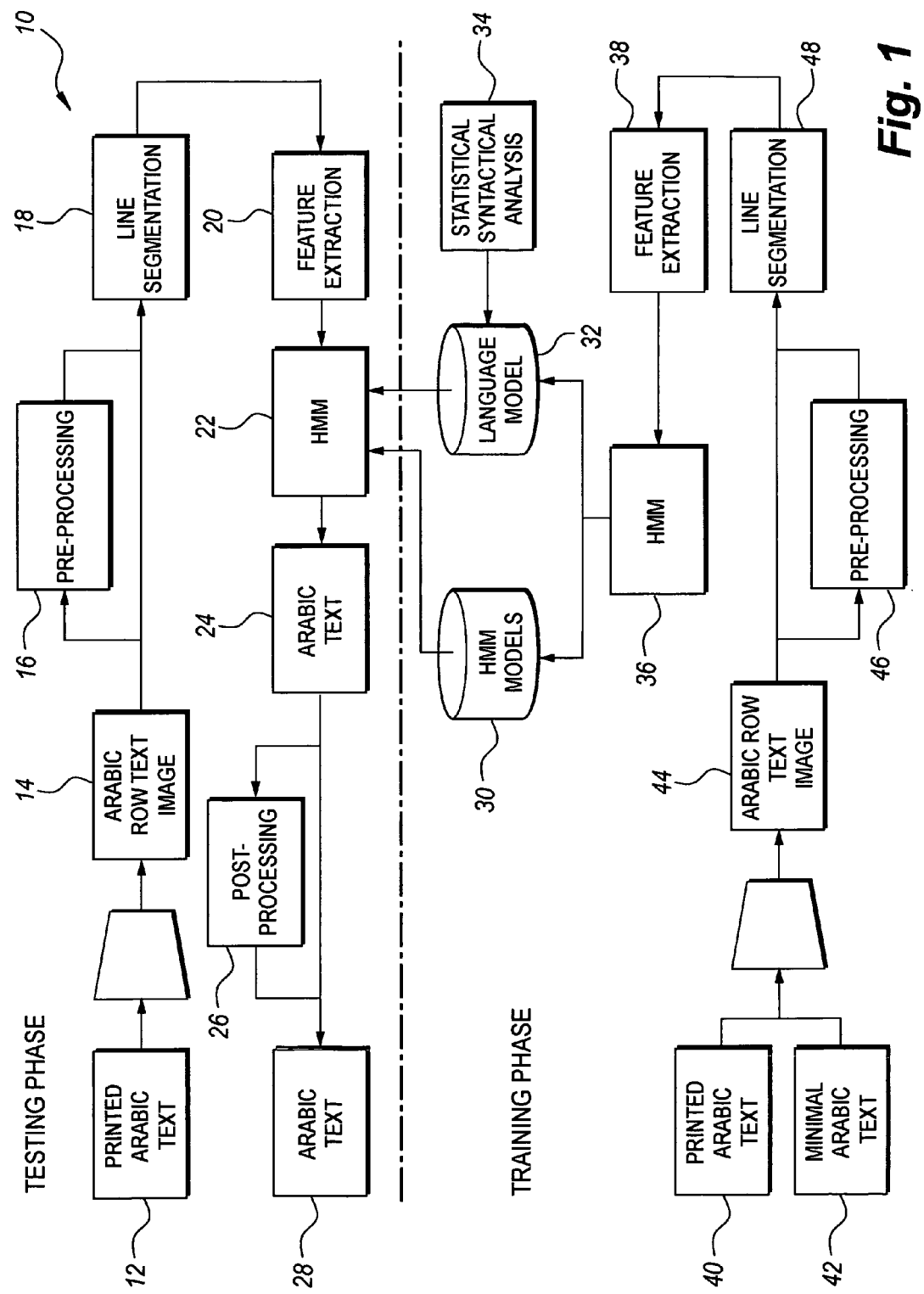
FIG. 1 is a block diagram illustrating the Automatic Arabic Text Recognition method according to the present invention.

FIG. 1 shows the OCR method steps 10. The OCR method 10 has two main phases, which include training of the system to Arabic printed text images by inputting images of printed Arabic text 40 and minimal Arabic text 42, and then using the produced models for classification of newly unseen scanned images of printed Arabic text. The corresponding recognized textual information is then generated. Scanned images of printed Arabic text and copies of minimal Arabic text are arranged in rows of text images 44, and then used to train an implementation system. Preprocessing 46 is performed, followed by a segmentation step 48 in which each page is segmented into lines. The features of each line are extracted at step 38. These features are input to the HMM at step 36. The features of all training data are presented. The HMM runs its training algorithms to produce codebook and language models, which are stored in a language model database 32. Moreover, the HMM used in the training exercise is stored in a HMM models database 30. A statistical and syntactical analysis on the text is performed at step 34.

In the classification stage, a new Arabic printed text image 12 in scanned form is input for text recognition using the OCR method 10. The text image 12 is row image formatted 14, preprocessed 16, and then passed through line segmentation 18, where lines are extracted. In the feature stage 20, the features of these lines are extracted and input to an optimized HMM 22, which is selected from the HMM models database 30 in the classification stage. In the classification stage, the corresponding recognized Arabic text is post-processed 26 and finally generated 28 on a display device. This is the output of the system that corresponds to the scanned input image data.

The text produced was analyzed, and the recognition rates computed. The achieved high recognition rates indicate the effectiveness of our feature extraction technique and the usefulness of the minimal Arabic text and the statistical analysis of Arabic text that is implemented with the system.

Figure 2:
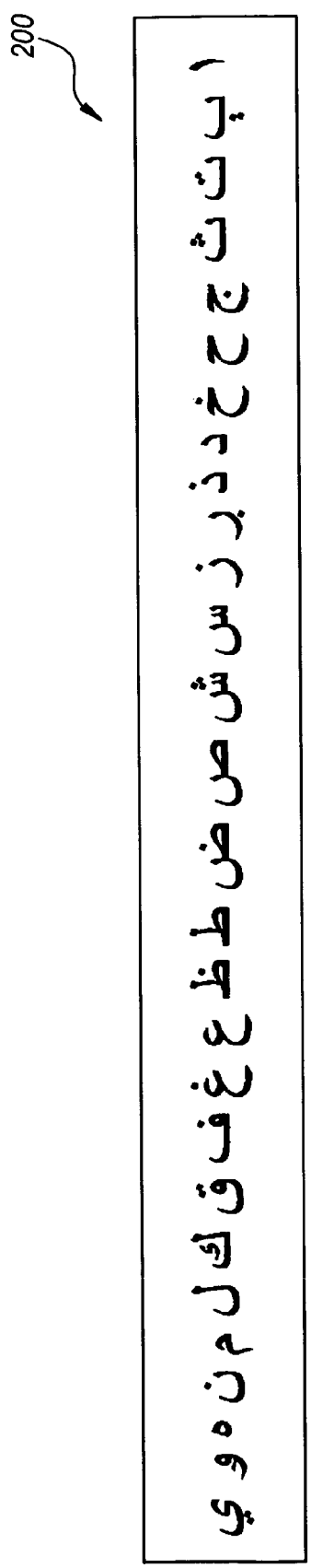
FIG. 2 is a block diagram showing an isolated form of all basic letters of Arabic text.

Arabic text is written from right to left. As shown in FIG. 2, the Arabic alphabet 200 has twenty-eight basic letters. An Arabic letter may have up to four basic different shapes, depending on the position of the letter in the word, i.e., whether it is a standalone, initial, terminal, or medial form. Letters of a word may overlap vertically with or without touching. Different Arabic letters have different sizes (height and width). Letters in a word can have short vowels (diacritics). These diacritics are written as strokes, placed either on top of or below the letters. A different diacritic on a letter may change the meaning of a word. Each diacritic has its own code as a separate letter when it is considered in a digital text. Readers of Arabic are accustomed to reading un-vocalized text by deducing the meaning from context.

Figure 3:
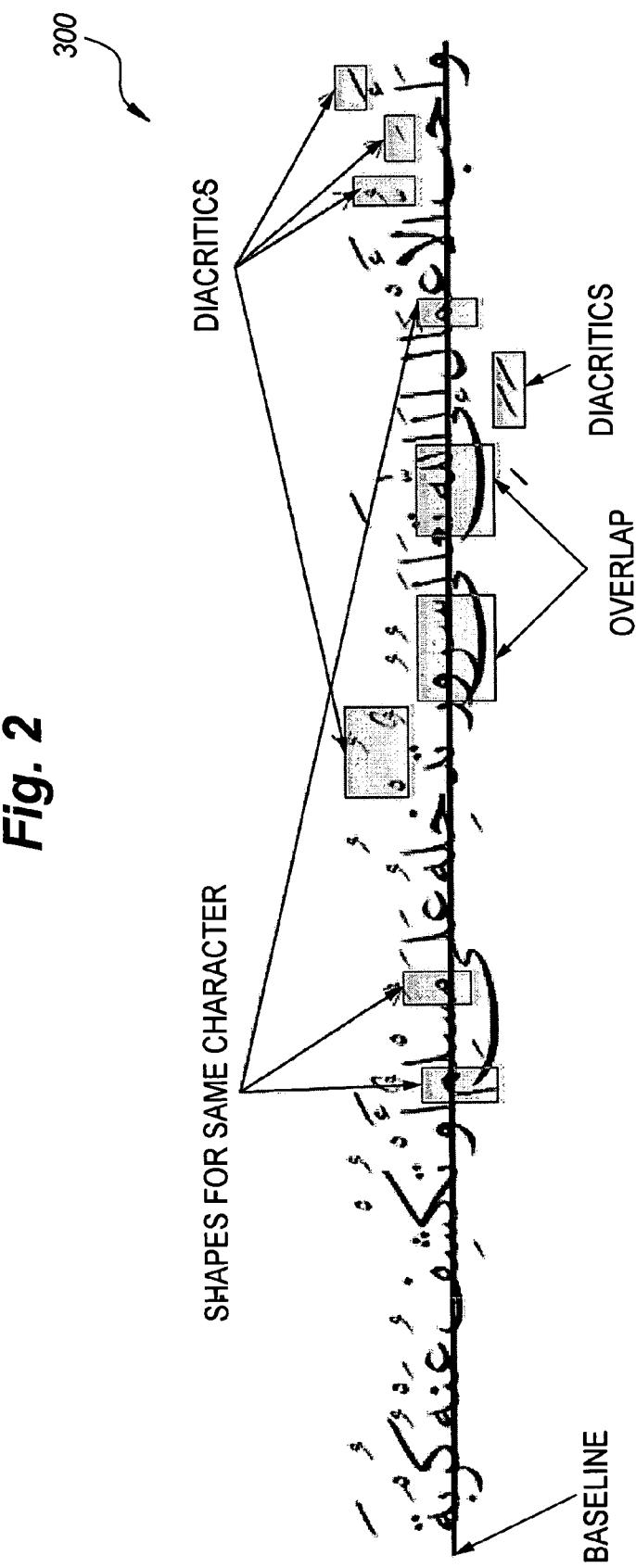
FIG. 3 is a block diagram showing a subset of Arabic text characteristics that may be strongly related to character recognition in the method of the present invention.

As shown in FIG. 3, a subset of Arabic text characteristics 300 may be strongly related to character recognition. For example, a base line, overlapping letters, diacritics, and three shapes of the Lam character (terminal, medial, and initial) are characteristics that have been demonstrated to be related to character recognition tasks. Table I shows the basic Arabic letters with their categories.

TABLE I

Basic Arabic Letters

| No. | Standalone | Terminal | Medial | Initial | Shapes | Class |
|---|---|---|---|---|---|---|
| 1 | ء | ء | ء | ء | 1 | 1 |
| 2 | آ | ـآ | ـآ | آ | 2 | 2 |
| 3 | أ | ـأ | ـأ | أ | 2 | 2 |
| 4 | ؤ | ـؤ | ـؤ | ؤ | 2 | 2 |
| 5 | إ | ـإ | ـإ | إ | 2 | 2 |
| 6 | ئ | ـئـ | ـئـ | ئـ | 4 | 3 |
| 7 | ا | ـا | ـا | ا | 2 | 2 |
| 8 | ب | ـب | ـبـ | بـ | 4 | 3 |
| 9 | ة | ـة | ـة | ة | 2 | 2 |
| 10 | ت | ـت | ـتـ | تـ | 4 | 3 |
| 11 | ث | ـث | ـثـ | ثـ | 4 | 3 |
| 12 | ج | ـج | ـجـ | جـ | 4 | 3 |
| 13 | ح | ـح | ـحـ | حـ | 4 | 3 |
| 14 | خ | ـخ | ـخـ | خـ | 4 | 3 |
| 15 | د | ـد | ـد | د | 2 | 2 |
| 16 | ذ | ـذ | ـذ | ذ | 2 | 2 |

TABLE I-continued

Basic Arabic Letters

| No. | Standalone | Terminal | Medial | Initial | Shapes | Class |
|---|---|---|---|---|---|---|
| 17 | ر | ـر | ـر | ر | 2 | 2 |
| 18 | ز | ـز | ـز | ز | 2 | 2 |
| 19 | س | ـس | ـسـ | سـ | 4 | 3 |
| 20 | ش | ـش | ـشـ | شـ | 4 | 3 |
| 21 | ص | ـص | ـصـ | صـ | 4 | 3 |
| 22 | ض | ـض | ـضـ | ضـ | 4 | 3 |
| 23 | ط | ـط | ـطـ | طـ | 4 | 3 |
| 24 | ظ | ـظ | ـظـ | ظـ | 4 | 3 |
| 25 | ع | ـع | ـعـ | عـ | 4 | 3 |
| 26 | غ | ـغ | ـغـ | غـ | 4 | 3 |
| 27 | ف | ـف | ـفـ | فـ | 4 | 3 |
| 28 | ق | ـق | ـقـ | قـ | 4 | 3 |
| 29 | ك | ـك | ـكـ | كـ | 4 | 3 |
| 30 | ل | ـل | ـلـ | لـ | 4 | 3 |
| 31 | م | ـم | ـمـ | مـ | 4 | 3 |
| 32 | ن | ـن | ـنـ | نـ | 4 | 3 |
| 33 | ه | ـه | ـهـ | هـ | 4 | 3 |
| 34 | و | ـو | ـو | و | 2 | 2 |
| 35 | لآ | لآ | ـلآ | لآ | 2 | 2 |
| 36 | لأ | لأ | ـلأ | لأ | 2 | 2 |
| 37 | لإ | لإ | ـلإ | لإ | 2 | 2 |
| 38 | لا | لا | ـلا | لا | 2 | 2 |
| 39 | ى | ـى | ـى | ى | 2 | 2 |
| 40 | ي | ـي | ـيـ | يـ | 4 | 3 |

We group them into three different classes according to the number of shapes each letter takes. Class 1 consists of the single shape of the Hamza, which comes in standalone state only, as shown in row 1 of Table I. Hamza does not connect with any other letter.

The second class (medial category) presents the letters that can come either standalone or connected only from the right (Rows 2-5, 7, 9, 15-18, and 35-39 of Table I).

The third class (Class 3) consists of the letters that can be connected from either side or both sides, and can also appear as standalone (Rows 6, 8, 10-14, 19-33, and 40 of Table I).

In order to use Hidden Markov Models (HMM), it is known to compute the feature vectors as a function of an independent variable. This simulates the use of HMM in speech recognition, where sliding frames/windows are used. Using the sliding window technique bypasses the need for segmenting Arabic text. The same technique is applicable to other languages. We use a known HMM classifier. However, the OCR method 10 utilizes a customized set of HMM parameters. The OCR method 10 allows transition to the current, the next, and the following states only. This structure allows nonlinear variations in the horizontal position.

For example, the Hidden Markov Model (HMM) toolkit (HTK), available from the University of Cambridge, models the feature vector with a mixture of Gaussians. It uses the Viterbi algorithm in the recognition phase, which searches for the most likely sequence of a character given the input feature vector.

Figure 4:
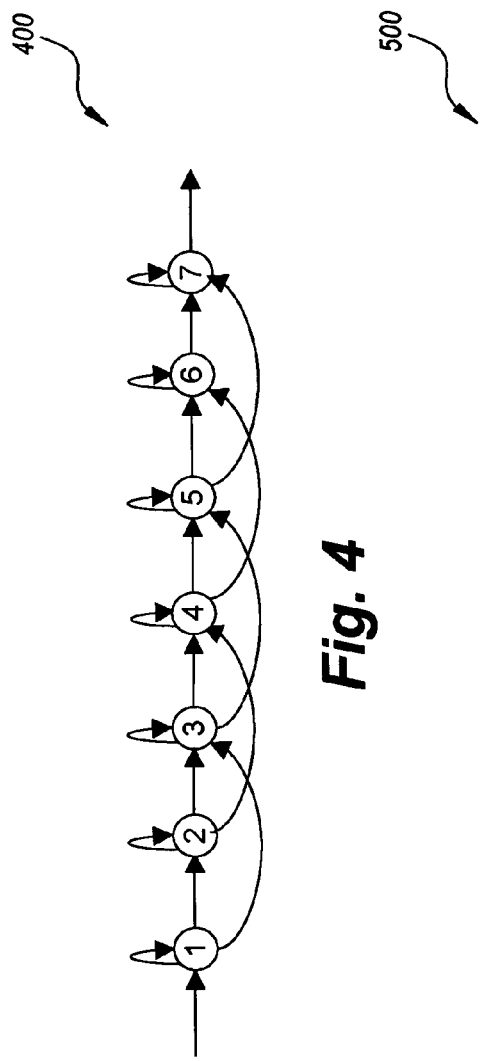
FIG. 4 is a block diagram showing a 7-state HMM which indicates the transitions between states in the method of the present invention.

A left-to-right HMM for the OCR method 10 is implemented. As shown in FIG. 4, a 7-state HMM 400 is configured with a predetermined allowable state transition sequence. The 7-state HMM model 400 allows relatively large variations in the horizontal position of the Arabic text. The sequence of state transition in the training and testing of the model is related to observations of each text segment feature. In this work, we have experimented with using different numbers of states and dictionary sizes, and describe herein the best mode for performing the OCR method 10. Although each character model could have a different number of states, the OCR method 10 adopts the same number of states for all characters in a font. However, the number of states and dictionary sizes for each font, in relation to the best recognition rates for each font, may vary.

A technique based on the sliding window principle is implemented to extract Arabic text features. A window with variable width and height is used. Horizontal and vertical overlapping-windows are used.

In many experiments, we tried different values for the window width and height, vertical and horizontal overlapping. Then different types of windows were utilized to get more features of each vertical segment and to decide on the most proper window size and the number of overlapping cells, vertically and horizontally. The direction of the text line is considered as the feature extraction axis. In addition, different types of features were tested.

Figure 5:
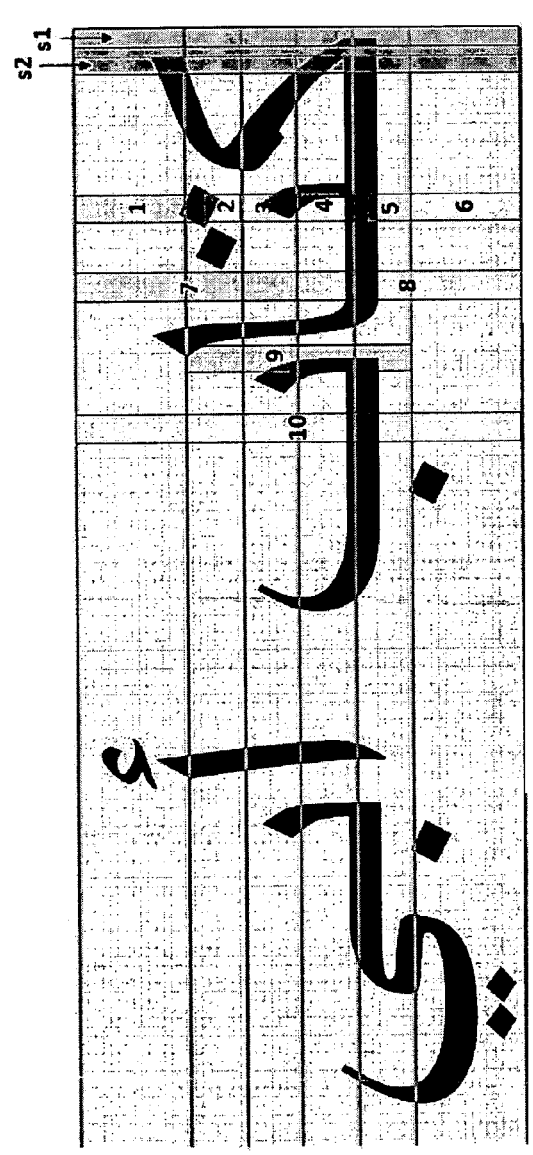
FIG. 5 is a block diagram showing Arabic writing line with stacked line segments, sliding window, and feature segments in the method of the present invention.

Based on the analysis of large corpora of Arabic text and a large number of experiments, the best Arabic text line model has been determined to have a stack of six horizontal line segments that split the Arabic text line vertically. The upper (top) and lower (bottom) segment heights are preferably approximately ¼ of the text line height. All other segments are preferably approximately ⅛ of the Arabic text line height. FIG. 5 illustrates a preferred hierarchical window structure 500 that results in the highest recognition rate. The sliding window is shown in two consecutive positions, s1 and s2. The window overlaps with the previous window by one pixel. Each Arabic text segment is represented by a 13-dimensional feature vector, as described below.

Starting from the first pixel of the text line image, a vertical segment of preferably three-pixels width and a text line of height (TLH) is taken. The windows of first hierarchical level are of different dimensions. The top and bottom windows are preferably 3-pixels wide and TLH/4 height, and the other four windows are preferably 3-pixels wide and TLH/8 height. The number of black pixels in the windows of the first level of the hierarchical structure is estimated. Six vertically non-overlapping windows are used to estimate the first six features (features 1 to 6). Three additional features (features 7 to 9) are estimated from three vertically non-overlapping windows of 3-pixels width and TLH/4 height (windows of the second level of the hierarchical structure). Then, an overlapping window with 3-pixels width and TLH/2 height (windows of the third level of the hierarchical structure) with an overlapping of TLH/4 is used to calculate three features (features 10 to 12). The last feature (feature 13) is found by estimating the number of black pixels in the whole vertical segment (the window of the fourth level of the hierarchical structure).

Hence, thirteen features are extracted for each horizontal slide. To calculate the following features, the vertical window is moved horizontally, keeping an overlap of one pixel. Thirteen features are extracted from each vertical strip and served as a feature vector in the training and/or testing processes.

It has to be noted that the window size and vertical and horizontal overlapping are made settable, and hence different features may be extracted using different window sizes and vertical and horizontal overlapping. The OCR method 10 extracts a small number of one type of feature (only thirteen features). Moreover, the OCR method 10 implements different sizes of windows, uses a hierarchical structure of windows for the same vertical strip, bypasses the need for segmentation of Arabic text, and applies to other languages with minimal changes to the basic method described herein. The thirteen features have been chosen after extensive experimental testing. Table II illustrates features and windows used in the feature extraction phase.

TABLE II

Features and Windows in Feature Extraction Phase

| Features $F_{13}$ | Features $F_{12}$ | Features $F_{10}$ to $F_{11}$ | Features $F_7$ to $F_9$ | Features $F_1$ to $F_6$ |
|---|---|---|---|---|
| $F_{13} =$ $F_{10} + F_{11}$ | $F_{12} =$ $F_2 + F_8 + F_5$ | $F_{11} =$ $F_4 + F_9$ | $F_9 =$ $F_5 + F_6$ | $F_6$ (sum of black pixels in $6^{th}$ vertical rectangle) |
| | | | | $F_5$ (sum of black pixels in $5^{th}$ vertical rectangle) |
| | | | $F_8 =$ $F_3 + F_4$ | $F_4$ (sum of black pixels in $4^{th}$ vertical rectangle) |
| | | $F_{10} =$ $F_7 + F_3$ | | $F_3$ (sum of black pixels in $3^{rd}$ vertical rectangle) |
| | | | $F_7 =$ $F_1 + F_2$ | $F_2$ (sum of black pixels in $2^{nd}$ vertical rectangle) |
| | | | | $F_1$ (sum of black pixels in $1^{st}$ vertical rectangle) |

It should be understood that no general adequate database for Arabic text recognition is freely available for researchers. Hence different researchers of Arabic text recognition use different data. To support this work we addressed the data problem in several ways, described herein.

The OCR method 10 uses a script that consists of a minimum number of letters (using meaningful Arabic words) that cover all possible letter shapes. This may be used for preparing databases and benchmarks for Arabic optical character recognition. In our case, it was used to augment the training of HMM to make sure that at least a number of samples of each character shape are used. To generate this data set, a corpora consisting of Arabic text of two Arabic lexicons, two HADITH books, and a lexicon containing the meaning of Quran tokens in Arabic was used. The electronic versions of such books and other old Arabic classical books could be found from different sites on the Internet. In a test for training of a Hidden Markov Model using an arbitrary 2500 lines of Arabic text, some characters had as low as eight occurrences, while other characters had over one thousand occurrences. It was noticed that characters with low number of occurrences had low recognition rates, as expected, due to the lack of enough samples for training. These reasons are some of the motivations that encouraged us to look for a minimal Arabic script for use in Arabic computing research.

The OCR method 10 addresses this problem by using a minimal Arabic text dataset. On analysis of Table I, supra, it was clear that there are thirty-nine shapes of letters that might come at the end of a word (terminal form), and twenty-three shapes of letters that might come at the beginning of a word (initial form). Hence, there should be some repetition of the letter shapes that come at the beginning in order to include all the shapes of Arabic letters.

Figure 6:
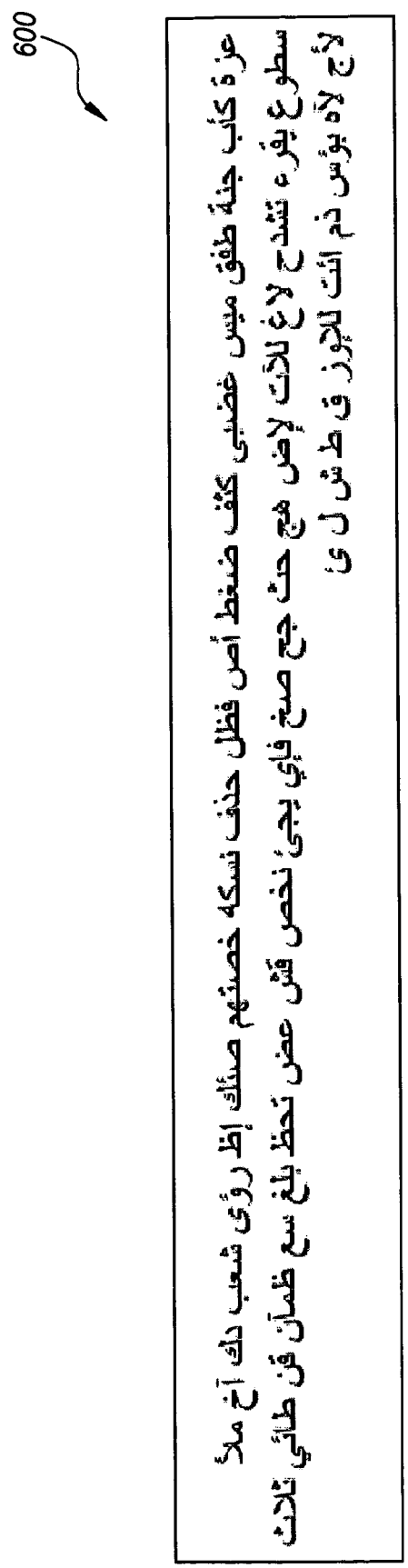
FIG. 6 is a block diagram showing the minimal Arabic script in the method of the present invention.

By using corpora of around 20 Megabytes of text and running our analysis and search modules, we obtained a nearly optimal script. The script was then further optimized manually in several iterations until reaching the text shown in FIG. 6. As shown in FIG. 6, initial letter shapes 600 have two occurrences each to compensate for the extra shapes of Arabic letter shapes that come at the end of a word (terminal). All other letter shapes are used only once. Hence, the text shown in FIG. 6 is the minimal possible text that covers all the shapes of Arabic alphabets. It is minimal in terms of the number of shapes used.

Selected Arabic printed text was used to generate synthesized images. The selected text was extracted from the books of Saheh Al-Bukhari and Saheh Muslem. The text of the books represents samples of standard classic Arabic. The extracted data comprises 2,766 lines of text, including words totaling 224,109 characters, including spaces. The average word length of the text is 3.93 characters. The length of the smallest line is forty-three characters. The longest line has eighty-nine characters. This data was used in features extraction, training, and testing of our technique. Images of the selected data were generated in eight fonts, viz., Arial, Tahoma, Akhbar, Thuluth, Naskh, Simplified Arabic, Andalus, and Traditional Arabic. Table III shows samples of these fonts.

TABLE III

Selected Font Samples

| Font Name | Sample |
| --- | --- |
| Arial | |
| Tahoma | |
| Akhbar | |
| Thuluth | |
| Naskh | |
| Simplified Arabic | |
| Andalus | |
| Traditional Arabic | |

Selected Arabic text was printed on paper with different fonts and then scanned with 300 dots-per-inch resolution. This text was also used to train and test the OCR method 10.

In order to statistically analyze Arabic text, two Arabic books have been chosen. The chosen books of Saheh Al-Bukhari and Saheh Muslem represent classic Arabic. The results of the analysis are tables showing the frequencies of Arabic letters and syllables in Arabic. These results include frequency of each Arabic letter in each syllable, frequencies of bigrams (a letter and its following letter) in each syllable, percentage of usage of Arabic letters, and syllables. The total number of syllables in the analyzed text is 2,217,178, with 18,170 unique syllables. The total number of characters is 4,405,318. The text includes 1,095,274 words, with 50,367 unique words. Table IV shows the frequencies and lengths of syllables.

TABLE IV

Frequency and Lengths of Syllables

| 90% syllables | Length 3 or Less |
| 98% syllables | Length 4 or Less |

90% of the syllables have length of 3 or less, and 98% of syllables are of length 4 or less. There are only eight syllables of length 9. As the length of syllables decreases, the number of different syllables increases. These tables may be used by HMM to generate the probabilities of the Arabic letters, bigrams, trigrams, etc., especially when the training data is limited.

In order to have enough samples of each class for each font, in the training phase, 2,500 lines were used for training, and the remaining 266 lines were used in testing. There is no overlap between training and testing samples. A file that contains the feature vectors of each line was prepared. The feature vector contains the thirteen features extracted for each vertical strip of the image of the text line by the method described earlier.

All feature vectors of the vertical strips of the line are concatenated to give the feature vectors of the text line. The group of the feature files of the first 2,500 lines represents the observation list for training. The group of the remaining 266 feature files represents the observation list for testing. Fifteen more lines of text were added to the training set to assure the inclusion of a sufficient number of all shapes of Arabic letters. These lines consist of five copies of the minimal Arabic script set. This normally improves the recognition rate of the letters that do not have enough samples in the training set. The recognition rates of the classification phase confirmed this claim.

A large number of trials were conducted to find the most suitable combinations of the number of suitable states and codebook sizes. Different combinations of the number of states and size of codebook were tested. We experimented with a number of states from 3 to 15, and with sizes of codebooks of 32, 64, 128, 192, 256, 320, 384, and 512. Table V shows the best combinations of number of states and size of codebook used for different fonts that give the best recognition rates for each font.

TABLE V

States and Codebook Size Per Font

| Font Name | Number of States | Codebook size |
| --- | --- | --- |
| Arial | 5 | 256 |
| Tahoma | 7 | 128 |
| Akhbar | 5 | 256 |
| Thuluth | 7 | 128 |
| Naskh | 7 | 128 |
| Simplified Arabic | 7 | 128 |
| Traditional Arabic | 7 | 256 |
| Andalus | 7 | 256 |

The results of testing 266 lines are shown in Table VI, which is a summary of results per font type, with and without shape expansion.

TABLE VI

Testing of 266 Lines

| | With Expanded shapes | | With Collapsed shapes | |
| --- | --- | --- | --- | --- |
| Text font | % of Correctness | % of Accuracy | % of Correctness | % of Accuracy |
| Arial | 99.89 | 99.85 | 99.94 | 99.90 |
| Tahoma | 99.80 | 99.57 | 99.92 | 99.68 |
| Akhbar | 99.33 | 99.25 | 99.43 | 99.34 |
| Thulth | 98.08 | 98.02 | 98.85 | 98.78 |
| Naskh | 98.12 | 98.02 | 98.19 | 98.09 |
| Simplified Arabic | 99.69 | 99.55 | 99.84 | 99.70 |
| Traditional Arabic | 98.85 | 98.81 | 98.87 | 98.83 |
| Andalus | 98.92 | 96.83 | 99.99 | 97.86 |

Table VI also indicates the effect of having a unique code for each shape of each character in the classification phase (Columns 2 & 3) and then combining the shapes of the same character into one code (Columns 4. & 5). In all cases there are improvements in both correctness and accuracy in combining the different shapes of the character after recognition into one code. The following two equations were used to calculate correctness and accuracy.

$$\begin{bmatrix} \text{Correctness \%} = \frac{\text{samples} - (\text{substitutions} + \text{deletions})}{\text{samples}} \times 100 \\ \text{Accuracy \%} = \frac{\text{samples} - (\text{substitutions} + \text{insertions} + \text{deletions})}{\text{samples}} \times 100 \end{bmatrix} \quad 5$$

Table VII shows the classifications results for the Arial font. The correctness percentage was 99.94% and the accuracy percentage was 99.90%. Only four letters out of forty-three had some errors. The letter ﺝ has been substituted by the letter ﺡ four times out of 234 instances. The only difference between the two characters is the dot in the body of the letter ﺝ. The second error consists of two replacements of the letter ﻩ by the letter ء out of 665 instances. The third error was substituting the ligature ﻻ by a blank four times out of forty. The fourth error was substituting the ligature ﻻ once by ﻩ out of 491 times. Other than the substitutions, ten insertions were added (two of them were-blanks).

TABLE VII

Classification Results for Arial Font

| Let | Samples | Correct | Errors | % Recognition | % Error | Del | Ins | Correctness | Accuracy | Error Details |
|---|---|---|---|---|---|---|---|---|---|---|
| Sil | 532 | 532 | 0 | 100.0 | 0.0 | 0 | 0 | 100.0 | 100.0 | |
| ء | 83 | 83 | 0 | 100.0 | 0.0 | 0 | 0 | 100.0 | 100.0 | |
| أ | 10 | 8 | 2 | 80.0 | 20.0 | 0 | 0 | 80.0 | 80.0 | |
| ا | 484 | 484 | 0 | 100.0 | 0.0 | 0 | 0 | 100.0 | 100.0 | |
| ؤ | 14 | 14 | 0 | 100.0 | 0.0 | 0 | 0 | 100.0 | 100.0 | |
| إ | 157 | 157 | 0 | 100.0 | 0.0 | 0 | 0 | 100.0 | 100.0 | |
| ئ | 43 | 43 | 0 | 100.0 | 0.0 | 0 | 0 | 100.0 | 100.0 | |
| ا | 2114 | 2114 | 0 | 100.0 | 0.0 | 0 | 1 | 100.0 | 100.0 | |
| ب | 409 | 409 | 0 | 100.0 | 0.0 | 0 | 0 | 100.0 | 100.0 | |
| ة | 234 | 234 | 0 | 100.0 | 0.0 | 0 | 0 | 100.0 | 100.0 | |
| ت | 420 | 420 | 0 | 100.0 | 0.0 | 0 | 0 | 100.0 | 100.0 | |
| ث | 124 | 124 | 0 | 100.0 | 0.0 | 0 | 0 | 100.0 | 100.0 | |
| ج | 170 | 170 | 0 | 100.0 | 0.0 | 0 | 0 | 100.0 | 100.0 | |
| ح | 234 | 230 | 4 | 98.3 | 1.7 | 0 | 0 | 98.3 | 98.3 | ج-4 |
| خ | 113 | 113 | 0 | 100.0 | 0.0 | 0 | 0 | 100.0 | 100.0 | |
| د | 344 | 344 | 0 | 100.0 | 0.0 | 0 | 1 | 100.0 | 99.7 | |
| ذ | 97 | 97 | 0 | 100.0 | 0.0 | 0 | 0 | 100.0 | 100.0 | |
| ر | 702 | 702 | 0 | 100.0 | 0.0 | 0 | 0 | 100.0 | 100.0 | |
| ز | 46 | 46 | 0 | 100.0 | 0.0 | 0 | 0 | 100.0 | 100.0 | |
| س | 640 | 640 | 0 | 100.0 | 0.0 | 0 | 0 | 100.0 | 100.0 | |
| ش | 119 | 119 | 0 | 100.0 | 0.0 | 0 | 0 | 100.0 | 100.0 | |
| ص | 415 | 415 | 0 | 100.0 | 0.0 | 0 | 0 | 100.0 | 100.0 | |
| ض | 93 | 93 | 0 | 100.0 | 0.0 | 0 | 0 | 100.0 | 100.0 | |
| ط | 68 | 68 | 0 | 100.0 | 0.0 | 0 | 0 | 100.0 | 100.0 | |
| ظ | 15 | 15 | 0 | 100.0 | 0.0 | 0 | 0 | 100.0 | 100.0 | |
| ع | 818 | 818 | 0 | 100.0 | 0.0 | 0 | 0 | 100.0 | 100.0 | |
| غ | 44 | 44 | 0 | 100.0 | 0.0 | 0 | 0 | 100.0 | 100.0 | |
| ف | 495 | 495 | 0 | 100.0 | 0.0 | 0 | 0 | 100.0 | 100.0 | |
| ق | 467 | 467 | 0 | 100.0 | 0.0 | 0 | 0 | 100.0 | 100.0 | |
| ك | 288 | 288 | 0 | 100.0 | 0.0 | 0 | 0 | 100.0 | 100.0 | |
| ل | 2136 | 2136 | 0 | 100.0 | 0.0 | 0 | 2 | 100.0 | 99.9 | |
| م | 1005 | 1005 | 0 | 100.0 | 0.0 | 0 | 0 | 100.0 | 100.0 | |
| ن | 1023 | 1023 | 0 | 100.0 | 0.0 | 0 | 0 | 100.0 | 100.0 | |
| ه | 665 | 663 | 2 | 99.7 | 0.3 | 0 | 0 | 99.7 | 99.7 | ء-2 |
| و | 937 | 937 | 0 | 100.0 | 0.0 | 0 | 0 | 100.0 | 100.0 | |
| ﻵ | 5 | 5 | 0 | 100.0 | 0.0 | 0 | 0 | 100.0 | 100.0 | |
| ﻻ | 40 | 36 | 4 | 90.0 | 10.0 | 0 | 0 | 90.0 | 90.0 | Blnk-4 |
| ﻹ | 14 | 14 | 0 | 100.0 | 0.0 | 0 | 0 | 100.0 | 100.0 | |
| ﻷ | 207 | 207 | 0 | 100.0 | 0.0 | 0 | 4 | 100.0 | 98.1 | |
| ى | 413 | 413 | 0 | 100.0 | 0.0 | 0 | 0 | 100.0 | 100.0 | |
| ي | 1159 | 1159 | 0 | 100.0 | 0.0 | 0 | 0 | 100.0 | 100.0 | |
| Blank | 4637 | 4637 | 0 | 100.0 | 0.0 | 0 | 2 | 100.0 | 100.0 | |
| لها | 491 | 490 | 1 | | | 0 | 0 | 99.8 | 99.8 | ه-1 |
| Ins | | | 10 | | | | | | | Blnk-2, لـ-4 ﻻ2, لـ-1 ا1 |
| Total | 22524 | 22511 | 13 | 99.94 | 0.06 | 0 | 10 | 99.94 | 99.90 |

Table VIIIA summarizes the results of Arial, Tahoma, Akhbar, and Thuluth fonts. Table VIIIB summarizes the results of Naskh, Simplified Arabic, Andalus, and Traditional Arabic fonts. Arial font was included for comparison purposes. The tables show the average correctness and accuracy of all these fonts.

As the resultant confusion matrices are too large to display in row format (at least 126 rows×126 columns are needed), we summarize the confusion matrix in a more informative way by collapsing all different shapes of the same character into one entry and by listing error details for each character. This will actually be the result after converting the recognized text from the unique coding of each shape to the unique coding of each character (which is done by the contextual analysis module, a tool we built for this purpose).

TABLE VIIIA

Summary of Results for Selected Fonts

| Let | Arial Correctness | Arial Accuracy | Tahoma Correctness | Tahoma Accuracy | Akhbar Correctness | Akhbar Accuracy | Thuluth Correctness | Thuluth Accuracy |
|---|---|---|---|---|---|---|---|---|
| S | 100 | 100 | 100 | 100 | 100 | 100 | 100 | 100 |
| ء | 100 | 100 | 100 | 98.8 | 96.3 | 96.3 | 100 | 97.4 |
| آ | 80 | 80 | 100 | 100 | 60 | 60 | 100 | 100 |
| ا | 100 | 100 | 100 | 100 | 99.6 | 99.6 | 99.8 | 99.8 |
| ؤ | 100 | 100 | 100 | 100 | 100 | 100 | 100 | 100 |
| إ | 100 | 100 | 100 | 100 | 100 | 100 | 100 | 100 |
| ئ | 100 | 100 | 100 | 100 | 100 | 100 | 100 | 100 |
| أ | 100 | 100 | 100 | 99.9 | 99.1 | 99 | 100 | 100 |
| ب | 100 | 100 | 100 | 100 | 99.3 | 99.3 | 93.9 | 93.9 |
| ة | 100 | 100 | 100 | 100 | 100 | 100 | 100 | 100 |
| ت | 100 | 100 | 99.8 | 99.8 | 100 | 100 | 97.8 | 97.6 |
| ث | 100 | 100 | 100 | 100 | 98.4 | 92.6 | 100 | 100 |
| ج | 100 | 100 | 99.4 | 99.4 | 100 | 100 | 97.1 | 97.1 |
| ح | 98.3 | 98.3 | 94.4 | 94.4 | 100 | 100 | 82 | 82 |
| خ | 100 | 100 | 100 | 100 | 100 | 100 | 98.2 | 98.2 |
| د | 100 | 99.7 | 100 | 99.1 | 100 | 99.7 | 99.1 | 98.8 |
| ذ | 100 | 100 | 100 | 100 | 100 | 100 | 100 | 100 |
| ر | 100 | 100 | 100 | 100 | 100 | 100 | 94.9 | 94.9 |
| ز | 100 | 100 | 100 | 100 | 100 | 100 | 100 | 100 |
| س | 100 | 100 | 100 | 100 | 99.8 | 98.9 | 99.8 | 99.8 |
| ش | 100 | 100 | 100 | 100 | 99.2 | 99.2 | 99.2 | 99.2 |
| ص | 100 | 100 | 100 | 100 | 100 | 100 | 99.8 | 99.8 |
| ض | 100 | 100 | 100 | 100 | 100 | 100 | 98.9 | 98.9 |
| ط | 100 | 100 | 98.5 | 97.1 | 100 | 100 | 97.1 | 97.1 |
| ظ | 100 | 100 | 100 | 100 | 100 | 100 | 100 | 100 |
| ع | 100 | 100 | 100 | 100 | 99.8 | 99.8 | 99.5 | 99.5 |
| غ | 100 | 100 | 100 | 100 | 97.7 | 97.7 | 97.7 | 97.7 |
| ف | 100 | 100 | 100 | 100 | 99.6 | 99.6 | 100 | 99.2 |
| ق | 100 | 100 | 100 | 100 | 98.9 | 98.9 | 100 | 100 |
| ك | 100 | 100 | 100 | 100 | 100 | 100 | 100 | 100 |
| ل | 100 | 99.9 | 100 | 97.9 | 98.1 | 97.9 | 99.8 | 99.7 |
| م | 100 | 100 | 100 | 100 | 99.9 | 99.9 | 98.2 | 98.1 |
| ن | 100 | 100 | 100 | 100 | 99.4 | 99.3 | 99.1 | 99.1 |
| ه | 99.7 | 99.7 | 100 | 100 | 99.7 | 99.7 | 99.1 | 99.1 |
| و | 100 | 100 | 100 | 100 | 100 | 100 | 99.8 | 99.8 |
| لا | 100 | 100 | 100 | 100 | 100 | 100 | 100 | 100 |
| لآ | 90 | 90 | 100 | 100 | 100 | 100 | 100 | 100 |
| لأ | 100 | 100 | 100 | 100 | 100 | 100 | 100 | 100 |
| لإ | 100 | 98.1 | 100 | 100 | 100 | 100 | 100 | 100 |
| ى | 100 | 100 | 100 | 100 | 100 | 100 | 89.1 | 89.1 |
| ي | 100 | 100 | 100 | 100 | 98.4 | 98.4 | 99.7 | 99.7 |
| B | 100 | 100 | 100 | 100 | 100 | 100 | 99.3 | 99.2 |
| à | 99.8 | 99.8 | 99.8 | 99.8 | 99.8 | 99.8 | 99.8 | 99.8 |
| T | 99.9 | 99.9 | 99.9 | 99.7 | 99.4 | 99.3 | 98.9 | 98.8 |

TABLE VIIIB

Summary of Results for Selected Fonts

| Let | Naskh Correctness | Naskh Accuracy | Simplified Arabic Correctness | Simplified Arabic Accuracy | Traditional Arabic Correctness | Traditional Arabic Accuracy | Andalus Correctness | Andalus Accuracy |
|---|---|---|---|---|---|---|---|---|
| S | 100 | 100 | 100 | 100 | 100 | 100 | 100 | 100 |
| ء | 100 | 100 | 100 | 100 | 100 | 100 | 100 | 100 |
| آ | 100 | 100 | 40 | 40 | 100 | 100 | 100 | 100 |
| ا | 100 | 100 | 96.3 | 96.3 | 98.5 | 98.5 | 100 | 100 |
| ؤ | 100 | 100 | 100 | 100 | 100 | 100 | 100 | 100 |
| إ | 100 | 100 | 100 | 100 | 100 | 100 | 100 | 100 |
| ئ | 97.7 | 97.7 | 100 | 100 | 100 | 100 | 100 | 100 |

TABLE VIIIB-continued

Summary of Results for Selected Fonts

| Let | Naskh | | Simplified Arabic | | Traditional Arabic | | Andalus | |
|---|---|---|---|---|---|---|---|---|
| | Correctness | Accuracy | Correctness | Accuracy | Correctness | Accuracy | Correctness | Accuracy |
| ا | 98.5 | 98.4 | 100 | 99.8 | 98.7 | 98.5 | 100 | 100 |
| ب | 89.3 | 88.4 | 100 | 100 | 92.5 | 92.5 | 100 | 99.8 |
| ة | 100 | 100 | 100 | 100 | 100 | 100 | 100 | 100 |
| ت | 98.8 | 98.8 | 99.8 | 99.8 | 99.1 | 99.1 | 100 | 100 |
| ث | 95.1 | 95.1 | 100 | 100 | 99.2 | 99.2 | 100 | 100 |
| ج | 96.5 | 96.5 | 100 | 100 | 91.8 | 91.8 | 100 | 100 |
| ح | 87.6 | 87.6 | 100 | 100 | 84.2 | 84.2 | 100 | 100 |
| خ | 90.3 | 89.4 | 100 | 100 | 98.2 | 97.4 | 100 | 100 |
| د | 100 | 100 | 100 | 99.7 | 99.7 | 99.4 | 100 | 99.7 |
| ذ | 100 | 100 | 100 | 100 | 100 | 100 | 100 | 100 |
| ر | 98.6 | 98.6 | 100 | 100 | 99.9 | 99.9 | 100 | 100 |
| ز | 100 | 100 | 100 | 100 | 100 | 100 | 100 | 100 |
| س | 99.2 | 99.2 | 100 | 100 | 99.7 | 99.7 | 100 | 100 |
| ش | 100 | 100 | 100 | 100 | 100 | 100 | 100 | 100 |
| ص | 98.8 | 98.8 | 100 | 100 | 98.8 | 98.8 | 100 | 100 |
| ض | 100 | 100 | 100 | 100 | 100 | 100 | 100 | 100 |
| ط | 97.1 | 97.1 | 100 | 100 | 100 | 100 | 100 | 100 |
| ظ | 100 | 100 | 100 | 100 | 100 | 100 | 100 | 100 |
| ع | 98.7 | 98.7 | 100 | 100 | 99.9 | 99.9 | 100 | 100 |
| غ | 100 | 100 | 100 | 100 | 100 | 100 | 100 | 100 |
| ف | 99.6 | 99.6 | 100 | 100 | 100 | 100 | 100 | 100 |
| ق | 99.1 | 99.1 | 99.8 | 99.8 | 100 | 100 | 100 | 100 |
| ك | 100 | 100 | 100 | 100 | 100 | 100 | 100 | 100 |
| ل | 98.2 | 98.1 | 100 | 99.7 | 99.6 | 99.6 | 100 | 77.7 |
| م | 90 | 89 | 100 | 100 | 94.1 | 94 | 100 | 100 |
| ن | 96.7 | 96.5 | 99.9 | 99.9 | 98.1 | 98 | 100 | 100 |
| ه | 99.7 | 99.7 | 100 | 100 | 99.1 | 99.1 | 100 | 100 |
| و | 99.9 | 99.9 | 100 | 100 | 100 | 100 | 100 | 100 |
| ﻵ | 100 | 100 | 100 | 100 | 100 | 100 | 100 | 100 |
| ﻷ | 97.5 | 97.5 | 100 | 100 | 100 | 100 | 100 | 100 |
| ﻹ | 100 | 100 | 100 | 100 | 100 | 100 | 100 | 100 |
| ﻻ | 99 | 99 | 100 | 100 | 100 | 100 | 100 | 100 |
| ى | 99.5 | 99.5 | 98.6 | 98.6 | 98.6 | 98.6 | 100 | 100 |
| ي | 97.7 | 97.7 | 100 | 100 | 98.4 | 98.4 | 100 | 100 |
| B | 99.4 | 99.4 | 100 | 99.6 | 99.9 | 99.9 | 99.9 | 99.9 |
| ﷲ | 99.8 | 99.8 | 99.8 | 99.8 | 99.8 | 99.8 | 100 | 100 |
| T | 98.2 | 98.1 | 99.8 | 99.7 | 98.9 | 98.8 | 100 | 97.9 |

In summary, our technique is based on a hierarchical sliding window technique with overlapping and non-overlapping windows. Based on Arabic text line analysis, we modeled Arabic text line into a stack of horizontal segments with different heights. Hence, the technique utilizes Arabic writing line structure to define the right segments to use. We represent each sliding strip by thirteen features from one type of simple feature for each sliding window. The OCR method 10 preferably includes the letters/ligatures آ, إ, أ, ﻵ, ﻷ, ﻹ, and ﷲ in their classifications. Each shape of an Arabic character is considered as a separate class. The number of classes became 126. The OCR method 10 does not require segmentation of Arabic text. Finally, the OCR method 10 is language independent. Hence, it may be used for the automatic recognition of other languages. We ran a successful proof of concept on English text and achieved similar recognition rates as the Arabic text without any modification to the structure or parameters of our model.

A number of applications can use the OCR method 10. The OCR method 10 can be used to convert scanned Arabic printed text to textual information, which results in savings in storage, and in the ability to search and index these documents. The OCR method 10 can be embedded in search engines, including Internet search engines, enabling it to search scanned Arabic text. The OCR method 10 can be integrated in office automation products and may be bundled with scanner devices for the Arabic market. The OCR method 10 can work for other languages, especially Urdu, Persian, and Ottoman, to name a few. The OCR method 10 may be integrated with an Arabic text-to-speech system for the blind. Hence, scanned Arabic text may be converted to text and then to speech for the blind.

It is to be understood that the present invention is not limited to the embodiment described above, but encompasses any and all embodiments within the scope of the following claims.

We claim:

1. A computer-implemented automatic Arabic text image optical character recognition method, comprising the steps of:
   accepting as input an optical image of Arabic text and a predetermined selection of minimal Arabic text, the selection of minimal Arabic text representing substantially all Arabic letter shape occurrences likely to be input as text for character recognition;

arranging all of the input Arabic text into a plurality of text image rows;

segmenting each of the Arabic text input rows into a hierarchical stack of six segments vertically;

performing feature extraction on the six segments of Arabic text for at least one of the input rows;

inputting results from the feature extraction step into a Hidden Markov Model (HMM);

storing results from the HMM to an HMM models database and to a language model database;

performing a statistical syntactical analysis on the at least one input row of Arabic text;

storing results of the statistical syntactical analysis to the language model database;

selecting an optimized HMM from the HMM models database based on the statistical results stored in the language model database;

inputting additional Arabic text; and performing text recognition on the additional Arabic text utilizing the optimized HMM.

2. The computer-implemented automatic Arabic text image optical character recognition method according to claim 1, wherein each of the Arabic text input rows has a height and the step of segmenting each of the Arabic text input rows includes the step of segmenting the stack segments into an upper segment and a lower segment, the upper and lower segments each having a height of ¼ of the height of the corresponding Arabic text input row.

3. The computer-implemented automatic Arabic text image optical character recognition method according to claim 2, wherein the step of segmenting each of the Arabic text input rows further includes segmenting the stack segments into four intermediate segments between the upper segment and the lower segment, each of the intermediate segments having a height of ⅛ of the corresponding Arabic text input row.

4. The computer-implemented automatic Arabic text image optical character recognition method according to claim 3, further comprising the step of defining a 13-dimensional feature vector using the features extracted in said step of performing feature extraction.

5. The computer-implemented automatic Arabic text image optical character recognition method according to claim 4, further comprising the step of sequentially sliding a feature extraction window horizontally across the Arabic text input row, adjacent feature extraction windows having an overlap of one pixel, the steps of performing feature extraction and defining a 13-dimensional feature vector being repeated for each successive sequential feature extraction window, the feature extraction window encompassing the six stack segments vertically.

6. The computer-implemented automatic Arabic text image optical character recognition method according to claim 5, wherein the step of performing feature extraction further comprises;

extracting a $1^{st}$ feature equal to summing black pixels in the lower segment of the feature extraction window;

extracting a $2^{nd}$ feature equal to summing black pixels in the first intermediate segment immediately above the lower segment in the feature extraction window;

extracting a $3^{rd}$ feature equal to summing black pixels in the second intermediate segment above the lower segment in the feature extraction window;

extracting a $4^{th}$ feature equal to summing black pixels in the third intermediate segment above the lower segment in the feature extraction window;

extracting a $5^{th}$ feature equal to summing black pixels in the intermediate segment immediately below the upper segment in the feature extraction window;

extracting a $6^{th}$ feature equal to summing black pixels in the upper segment in the feature extraction window;

extracting a $7^{th}$ feature comprising summing the first and second features;

extracting an $8^{th}$ feature comprising summing the third and fourth features;

extracting a $9^{th}$ feature comprising summing the fifth and sixth features;

extracting a $10^{th}$ feature comprising summing the seventh and third features;

extracting a $11^{th}$ feature comprising summing the fourth and ninth features;

extracting a $12^{th}$ feature comprising summing the second, eighth and fifth features; and extracting a $13^{th}$ feature comprising summing the tenth and eleventh features.

7. The computer-implemented automatic Arabic text image optical character recognition method according to claim 1, further comprising the step of performing statistical analysis of the input Arabic text to compute the probabilities of Arabic letters correctly recognized.

8. The computer-implemented automatic Arabic text image optical character recognition method according to claim 7, wherein the Arabic text statistical analysis step comprises analyzing bi-grams.

9. The computer-implemented automatic Arabic text image optical character recognition method according to claim 1, further comprising the step of using separate HMM models for the different shapes of each Arabic character.

10. A computer-implemented automatic Arabic text image optical character recognition method, comprising the steps of:

accepting as input an optical image of printed Arabic text;

arranging all of the input Arabic text into a plurality of text image rows;

segmenting each of the input Arabic text rows into a hierarchical stack of six segments vertically;

performing feature extraction on the six segments of input Arabic text for at least one of the input rows;

inputting results from the feature extraction step into an optimized Hidden Markov Model HMM; and performing text recognition on the input Arabic text image utilizing the optimized HMM.

11. The computer-implemented automatic Arabic text image optical character recognition method according to claim 10, wherein each of the input Arabic text rows has a height and the step of segmenting each of the input Arabic text rows includes the step of segmenting the stack segments into an upper segment and a lower segment, the upper and lower segments each having a height of ¼ of the height of the corresponding input Arabic text row.

12. The computer-implemented automatic Arabic text image optical character recognition method according to claim 11, wherein the step of segmenting each of the input Arabic text rows further includes segmenting the stack segments into four intermediate segments between the upper segment and the lower segment, each of the intermediate segments having a height of ⅛ of the corresponding input Arabic text row.

13. The computer-implemented automatic Arabic text image optical character recognition method according to claim 12, further comprising the step of defining a 13-dimensional feature vector using the features extracted in said step of performing feature extraction.

14. The computer-implemented automatic Arabic text image optical character recognition method according to claim 13, further comprising the step of sequentially sliding a feature extraction window horizontally across the input Arabic text row, adjacent feature extraction windows having an overlap of one pixel, the steps of performing feature extraction and defining a 13-dimensional feature vector being repeated for each successive sequential feature extraction window, the feature extraction window encompassing the six stack segments vertically.

15. The computer-implemented automatic Arabic text image optical character recognition method according to claim 14, wherein the step of performing feature extraction further comprises;

extracting a $1^{st}$ feature equal to summing black pixels in the lower segment of the feature extraction window;

extracting a $2^{nd}$ feature equal to summing black pixels in the first intermediate segment immediately above the lower segment in the feature extraction window;

extracting a $3^{rd}$ feature equal to summing black pixels in the second intermediate segment above the lower segment in the feature extraction window;

extracting a $4^{th}$ feature equal to summing black pixels in the third intermediate segment above the lower segment in the feature extraction window;

extracting a $5^{th}$ feature equal to summing black pixels in the intermediate segment immediately below the upper segment in the feature extraction window;

extracting a $6^{th}$ feature equal to summing black pixels in the upper segment in the feature extraction window;

extracting a $7^{th}$ feature comprising summing the first and second features;

extracting an $8^{th}$ feature comprising summing the third and fourth features;

extracting a $9^{th}$ feature comprising summing the fifth and sixth features;

extracting a $10^{th}$ feature comprising summing the seventh and third features;

extracting a $11^{th}$ feature comprising summing the fourth and ninth features;

extracting a $12^{th}$ feature comprising summing the second, eighth and fifth features; and extracting a $13^{th}$ feature comprising summing the tenth and eleventh features.

16. The computer-implemented automatic Arabic text image optical character recognition method according to claim 10, further comprising the step of using separate HMM models for the different shapes of each Arabic character.

* * * * *